US012638203B2

(12) United States Patent
Kiningham et al.

(10) Patent No.: US 12,638,203 B2
(45) Date of Patent: May 26, 2026

(54) BLOWER SPEED AIRFLOW SELECTION

(71) Applicant: Carrier Corporation, Palm Beach Gardens, FL (US)

(72) Inventors: Paul Kiningham, Roanoke, IN (US); Ross Mielke, Westfield, IN (US); Brian Merkel, Lafayette, IN (US); Damaris Torres-Crespo, Indianapolis, IN (US); Joshua Hammel, Indianapolis, IN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 414 days.

(21) Appl. No.: 18/323,527

(22) Filed: May 25, 2023

(65) Prior Publication Data

US 2023/0383977 A1 Nov. 30, 2023

Related U.S. Application Data

(60) Provisional application No. 63/345,482, filed on May 25, 2022.

(51) Int. Cl.
| | |
|---|---|
| *F24F 11/65* | (2018.01) |
| *F24F 11/48* | (2018.01) |
| *F24F 11/52* | (2018.01) |
| *F24F 11/77* | (2018.01) |

(52) U.S. Cl.
CPC .............. *F24F 11/48* (2018.01); *F24F 11/52* (2018.01); *F24F 11/65* (2018.01); *F24F 11/77* (2018.01); *G05B 2219/2614* (2013.01)

(58) Field of Classification Search
CPC .. F24F 11/48; F24F 11/52; F24F 11/65; F24F 11/77; G05B 2219/2614
See application file for complete search history.

(56) References Cited

U.S. PATENT DOCUMENTS

| | | | |
|---|---|---|---|
| 4,860,231 | A | 8/1989 | Ballard et al. |
| 5,331,944 | A | 7/1994 | Kujawa et al. |
| 5,559,407 | A | 9/1996 | Dudley et al. |
| 5,791,332 | A | 8/1998 | Thompson et al. |
| 7,101,172 | B2 | 9/2006 | Jaeschke |
| 7,640,761 | B2 | 1/2010 | Garrett et al. |
| 8,078,326 | B2 | 12/2011 | Harrod et al. |
| 8,364,318 | B2 | 1/2013 | Grabinger et al. |
| 8,602,772 | B2 | 12/2013 | Fan et al. |
| 8,615,326 | B2 | 12/2013 | Filbeck et al. |
| 8,672,670 | B2 | 3/2014 | Hugghins |
| 8,672,733 | B2 | 3/2014 | Chen et al. |

(Continued)

*Primary Examiner* — Michael W Choi

(74) *Attorney, Agent, or Firm* — CANTOR COLBURN LLP

(57) ABSTRACT

A method of establishing airflow settings for heating, ventilation, and air conditioning (HVAC) equipment is provided. The method includes identifying a parameter for the HVAC equipment, defining a recipe for the HVAC equipment in accordance with the parameter, generating a recipe file associated with the recipe and comprising lists of selectable options for each mode of operation of the HVAC equipment, permitting selections from each of the lists for each mode of operation of the HVAC equipment via a user interface (UI) during an installation of the HVAC equipment in a system and setting operations of the HVAC equipment according to each of the selections.

16 Claims, 5 Drawing Sheets

| High heat | | | | |
|---|---|---|---|---|
| Default airflow index <u>401</u> | Minimum standard airflow index <u>402</u> | Maximum standard airflow index <u>403</u> | Minimum available airflow index <u>404</u> | Maximum available airflow index <u>405</u> |
| Low heat | | | | |
| Default airflow index <u>401</u> | Minimum standard airflow index <u>402</u> | Maximum standard airflow index <u>403</u> | Minimum available airflow index <u>404</u> | Maximum available airflow index <u>405</u> |
| High cool | | | | |
| Default airflow index <u>401</u> | Minimum standard airflow index <u>402</u> | Maximum standard airflow index <u>403</u> | Minimum available airflow index <u>404</u> | Maximum available airflow index <u>405</u> |
| Low cool | | | | |
| Default airflow index <u>401</u> | Minimum standard airflow index <u>402</u> | Maximum standard airflow index <u>403</u> | Minimum available airflow index <u>404</u> | Maximum available airflow index <u>405</u> |
| Continuous fan | | | | |
| Default airflow index <u>401</u> | Minimum standard airflow index <u>402</u> | Maximum standard airflow index <u>403</u> | Minimum available airflow index <u>404</u> | Maximum available airflow index <u>405</u> |

(56)         References Cited

U.S. PATENT DOCUMENTS

| | | | |
|---|---|---|---|
| 8,738,185 | B2 | 5/2014 | Puranen et al. |
| 9,200,847 | B2 | 12/2015 | Thompson |
| 9,261,277 | B2 | 2/2016 | Hugghins et al. |
| 9,562,710 | B2 | 2/2017 | Pham et al. |
| 9,638,432 | B2 | 5/2017 | Sinur et al. |
| 10,558,227 | B2 | 2/2020 | Alcala Perez et al. |
| 10,738,790 | B2 | 8/2020 | Sun et al. |
| 10,774,838 | B2 | 9/2020 | Yang et al. |
| 10,995,968 | B2 | 5/2021 | Ray et al. |
| 11,280,508 | B1 * | 3/2022 | Kraft ........................ F24F 11/49 |
| 11,320,213 | B2 | 5/2022 | Wilson et al. |
| 2007/0095082 | A1 * | 5/2007 | Garrett ..................... F24F 11/77 |
| | | | 62/158 |
| 2007/0289322 | A1 | 12/2007 | Mathews |
| 2012/0212166 | A1 * | 8/2012 | Merkel ................... F24F 11/77 |
| | | | 318/400.08 |

* cited by examiner

200

201 — Identifying parameter for HVAC equipment

202 — Defining recipe for HVAC equipment in accordance with parameter

203 — Generating recipe file

204 — Permitting selections

2041 — Distributing application

2042 — Displaying lists of selectable options

2043 — Receiving inputs

205 — Setting operations

FIG. 3

| High heat | | |
|---|---|---|
| Supported airflows 301 | Minimum airflows 302 | Maximum airflows 303 |
| Low heat | | |
| Supported airflows 301 | Minimum airflows 302 | Maximum airflows 303 |
| High cool | | |
| Supported airflows 301 | Minimum airflows 302 | Maximum airflows 303 |
| Low cool | | |
| Supported airflows 301 | Minimum airflows 302 | Maximum airflows 303 |
| Continuous fan | | |
| Supported airflows 301 | Minimum airflows 302 | Maximum airflows 303 |

FIG. 4

| High heat | | | | |
|---|---|---|---|---|
| Default airflow index 401 | Minimum standard airflow index 402 | Maximum standard airflow index 403 | Minimum available airflow index 404 | Maximum available airflow index 405 |
| Low heat | | | | |
| Default airflow index 401 | Minimum standard airflow index 402 | Maximum standard airflow index 403 | Minimum available airflow index 404 | Maximum available airflow index 405 |
| High cool | | | | |
| Default airflow index 401 | Minimum standard airflow index 402 | Maximum standard airflow index 403 | Minimum available airflow index 404 | Maximum available airflow index 405 |
| Low cool | | | | |
| Default airflow index 401 | Minimum standard airflow index 402 | Maximum standard airflow index 403 | Minimum available airflow index 404 | Maximum available airflow index 405 |
| Continuous fan | | | | |
| Default airflow index 401 | Minimum standard airflow index 402 | Maximum standard airflow index 403 | Minimum available airflow index 404 | Maximum available airflow index 405 |

Figure 5:
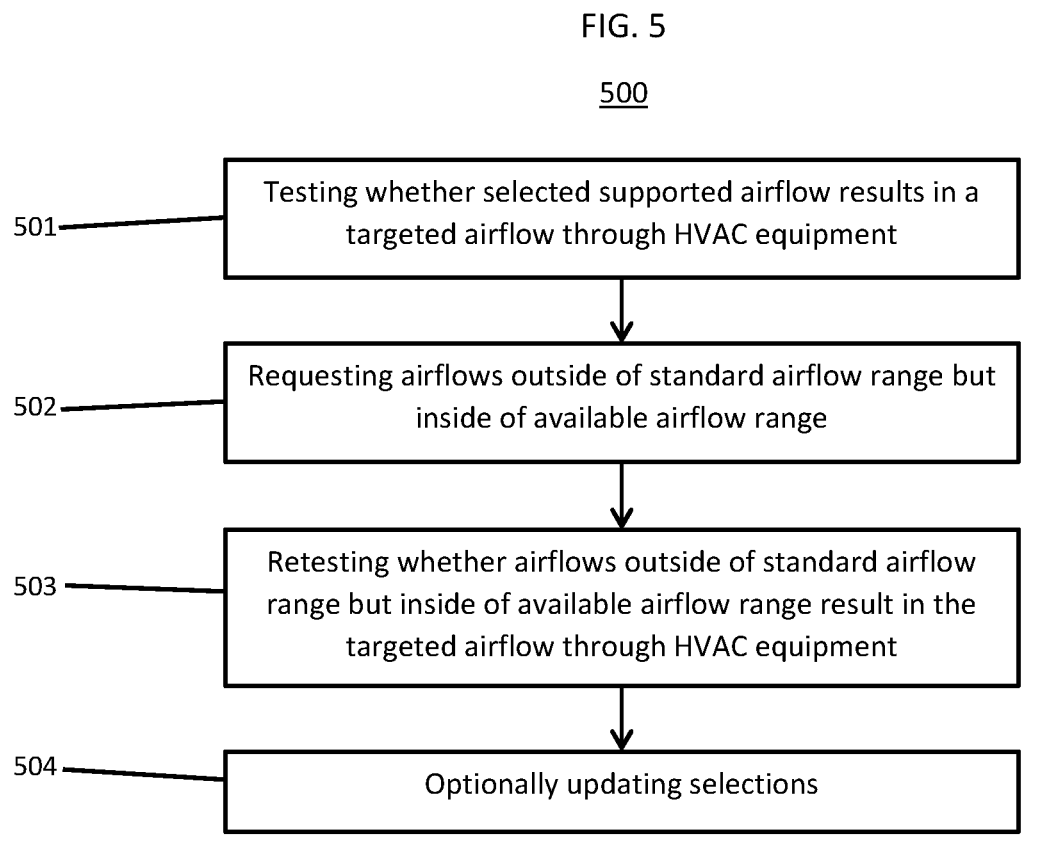

| |
|---|
| 501 — Testing whether selected supported airflow results in a targeted airflow through HVAC equipment |

↓

| |
|---|
| 502 — Requesting airflows outside of standard airflow range but inside of available airflow range |

↓

| |
|---|
| 503 — Retesting whether airflows outside of standard airflow range but inside of available airflow range result in the targeted airflow through HVAC equipment |

↓

| |
|---|
| 504 — Optionally updating selections |

BLOWER SPEED AIRFLOW SELECTION

CROSS-REFERENCE TO RELATED APPLICATIONS

This application claims the benefit of U.S. Provisional Application No. 63/345,482 filed May 25, 2022, the disclosure of which is incorporated herein by reference in its entirety.

BACKGROUND

The following description relates to heating, ventilation, and air conditioning (HVAC) equipment configuration and, more specifically, to methods for setting blower speeds for HVAC equipment (e.g., in residential furnaces).

A furnace is an appliance used to generate heat for all or part of a building. Furnaces are mostly used as a major component of a central heating system and can be installed to provide heat to an interior space through intermediary fluid movement, which may be air, steam, or hot water.

In conventional systems, furnaces tend to only have a five-speed blower with only three speeds available for use in a given installation. More recent furnaces, however, can make use of additional speeds. Operations of these furnaces often need a way to determine airflows as well as a way of selecting proper airflows in the field. In addition, in some cases, cooling airflows must be adjusted to new targets, which is a further requirement that adds to the complexity of selecting the correct airflows. Historically, this selection of airflows was provided through manual interaction with a series of dipswitches that, when set correctly, correlate to available airflows for the furnace from the full table of available airflows stored on the control board of the furnace. This manual interaction and requirement for storing the airflows locally is not ideal. Accordingly, there remains a need for an improved way in which to select airflow speeds for HVAC equipment.

BRIEF DESCRIPTION

According to an aspect of the disclosure, a method of establishing airflow settings for heating, ventilation, and air conditioning (HVAC) equipment is provided. The method includes identifying a parameter for the HVAC equipment, defining a recipe for the HVAC equipment in accordance with the parameter, generating a recipe file associated with the recipe and comprising lists of selectable options for each mode of operation of the HVAC equipment, permitting selections from each of the lists for each mode of operation of the HVAC equipment via a user interface (UI) during an installation of the HVAC equipment in a system and setting operations of the HVAC equipment according to each of the selections.

In accordance with additional or alternative embodiments, the HVAC equipment includes a variable speed blower.

In accordance with additional or alternative embodiments, the parameter for the HVAC equipment is a size of the HVAC equipment.

In accordance with additional or alternative embodiments, the HVAC equipment is operable in a high heat mode, a low heat mode, a high cool mode, a low cool mode, and a continuous fan mode.

In accordance with additional or alternative embodiments, the lists of the selectable options include a list of supported airflows for each mode of operation of the HVAC equipment, a list of minimum airflows for each mode of operation of the HVAC equipment and a list of maximum airflows for each mode of operation of the HVAC equipment.

In accordance with additional or alternative embodiments, the lists of the selectable options include default airflow indexes for each mode of operation of the HVAC equipment, minimum standard airflow indexes for each mode of operation of the HVAC equipment, maximum standard airflow indexes for each mode of operation of the HVAC equipment, minimum available airflow indexes for each mode of operation of the HVAC equipment and maximum available airflow indexes for each mode of operation of the HVAC equipment.

In accordance with additional or alternative embodiments, the permitting includes distributing an application to a mobile device, displaying the lists of the selectable options in the user interface (UI), which is associated with the application and receiving inputs of the selections via the UI.

In accordance with additional or alternative embodiments, once the installer makes a selection, the permitting further includes testing whether the selection results in a targeted airflow through the HVAC equipment, permitting the installer to request airflows outside of a standard airflow range but inside of an available airflow range, retesting whether the airflows outside of the standard airflow range but inside of the available airflow range result in the targeted airflow through the HVAC equipment and optionally updating the selection in accordance with results of the retesting.

According to an aspect of the disclosure, a method of establishing airflow settings for heating, ventilation, and air conditioning (HVAC) equipment is provided. The method includes identifying a size of the HVAC equipment, defining a recipe for the HVAC equipment in accordance with the size, generating a recipe file associated with the recipe and including, for each mode of operation of the HVAC equipment, a list of support airflows, a list of minimum airflows and a list of maximum airflows, permitting, for each of the modes of operation of the HVAC equipment via a user interface (UI), selections from each of the lists by an installer during an installation of the HVAC equipment in a system and setting operations of the HVAC equipment according to each of the selections.

In accordance with additional or alternative embodiments, the HVAC equipment includes a variable speed blower.

In accordance with additional or alternative embodiments, the HVAC equipment is operable in a high heat mode, a low heat mode, a high cool mode, a low cool mode and a continuous fan mode.

In accordance with additional or alternative embodiments, the permitting includes distributing an application to a mobile device, displaying each list in the user interface (UI), which is associated with the application and receiving inputs of the selections via the UI.

In accordance with additional or alternative embodiments, once the installer makes a selection, the permitting further includes testing whether the selection results in a targeted airflow through the HVAC equipment, permitting the installer to request airflows outside of a standard airflow range but inside of an available airflow range, retesting whether the airflows outside of the standard airflow range but inside of the available airflow range result in the targeted airflow through the HVAC equipment and optionally updating the selection in accordance with results of the retesting.

According to an aspect of the disclosure, heating, ventilation, and air conditioning (HVAC) equipment is provided. The HVAC equipment includes a cabinet, a blower configured to drive airflows through the cabinet and a control board coupled to the blower and configured to control operations of the blower in accordance with HVAC equipment settings. The HVAC equipment settings are established in response to selections made by an installer during an installation of the HVAC equipment of selectable options of a recipe file, which is generated in accordance with a parameter for the HVAC equipment, for each mode of operation of the HVAC equipment.

In accordance with additional or alternative embodiments, the blower is a variable speed blower.

In accordance with additional or alternative embodiments, the parameter for the HVAC equipment is a size of the HVAC equipment.

In accordance with additional or alternative embodiments, the HVAC equipment is operable in a high heat mode, a low heat mode, a high cool mode, a low cool mode and a continuous fan mode.

In accordance with additional or alternative embodiments, the selectable options include supported airflows for each mode of operation of the HVAC equipment, minimum airflows for each mode of operation of the HVAC equipment and maximum airflows for each mode of operation of the HVAC equipment.

In accordance with additional or alternative embodiments, the selectable options include default airflow indexes for each mode of operation of the HVAC equipment, minimum standard airflow indexes for each mode of operation of the HVAC equipment, maximum standard airflow indexes for each mode of operation of the HVAC equipment, minimum available airflow indexes for each mode of operation of the HVAC equipment and maximum available airflow indexes for each mode of operation of the HVAC equipment.

In accordance with additional or alternative embodiments, the control board is receptive of the selections made by the installer via the user interface (UI), which is a UI of a mobile application.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

FIG. 3 is a schematic diagram of lists of selectable options of a recipe file for HVAC equipment in accordance with exemplary alternative embodiments;

FIG. 4 is a schematic diagram of lists of selectable options of a recipe file for HVAC equipment in accordance with exemplary alternative embodiments; and FIG. 5 is a flow diagram illustrating certain permitted operations of a method of establishing airflow settings for HVAC equipment in accordance with exemplary embodiments.

DETAILED DESCRIPTION

Historically, selecting airflows for many pieces of heating, ventilation, and air conditioning (HVAC) equipment (e.g., furnaces, etc.) was provided through manual interaction with a series of dipswitches that, when set correctly, correlate to available airflows for the HVAC equipment. The full table of available airflows has been conventionally stored on the control board of the HVAC equipment (e.g., on the control board attached to the blower in the furnace housing). An improved way in which to select airflow speeds for the HVAC equipment is provided herein. It will be appreciated that although described in terms of the HVAC equipment being a furnace (e.g., for a residential HVAC system), the HVAC equipment may be any suitable piece of HVAC equipment capable of setting airflow speeds as described herein.

Existing furnaces only had a five (5) speed blower, with only three (3) speeds available for use. This has potential to cause a less than optimal efficiency as the same limited airflows were used across different furnaces sizes. With the introduction of furnaces with variable speed blowers, the possibility of using a plethora of different airflows is now available. Storing these different airflows on the control board (as is done in conventional systems) would not be ideal due to storage limits, etc., of the conventional control board boards. Solutions for enabling the use of the different airflows (resulting in increased efficiency of the HVAC equipment) and removing the storage of these different airflows from the control board are provided. These solutions may be described from the viewpoint of the installer (e.g., HVAC technician) who would select airflows for the particular furnace, optimized for each mode of operation for the furnace.

Figure 1:
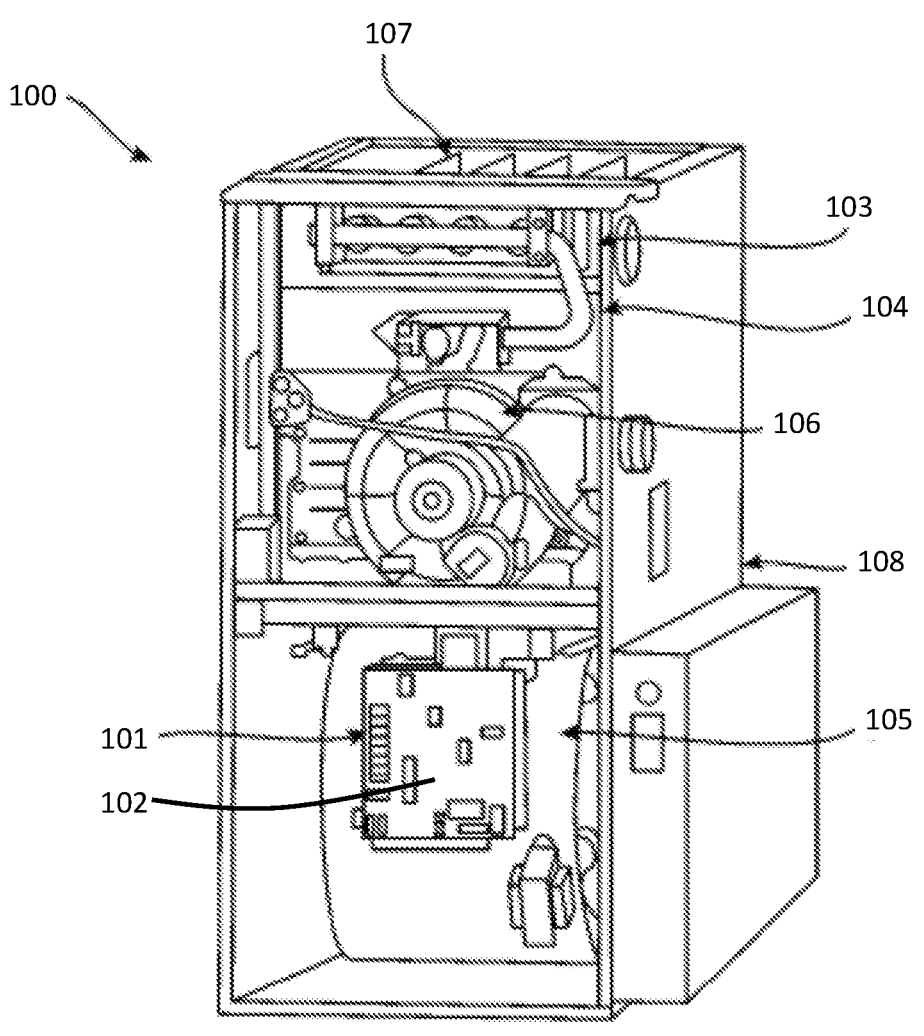
FIG. 1 is a perspective view of an exemplary piece of heating, ventilation, and air conditioning (HVAC) equipment, embodied for example as a furnace, in accordance with exemplary embodiments.

With reference to FIG. 1, an item of HVAC equipment 100, such as a furnace, for an HVAC system is provided. The HVAC equipment 100 includes a control device 101 having a microprocessor and a memory. Control device 101 is operatively connected to the HVAC equipment 100 and includes a control board 102 on which at least the microprocessor is supported. The control device 101 is disposed in communication with at least one sensor, for example, a thermistor. It will be appreciated that memory of control device 101, may be in whole or in part, external of control device 101, for example on an external device or hosted on a cloud server (not shown). The control device 101 may initiate, terminate, or adjust one or more operational modes of the HVAC equipment 100 as discussed below.

That is, the control device 101 and, more specifically, the control board 102 may be coupled to a blower motor and fan 105 (to be described below) and may be configured to control operations of the blower motor and fan 105 in accordance with HVAC equipment settings. These HVAC equipment settings are established in response to selections made by an installer, during an installation of the HVAC equipment 100, of selectable options of a recipe file (to be described below), which is generated in accordance with a parameter for the HVAC equipment 100 (e.g., a size of the HVAC equipment 100 or a furnace size), for each mode of operation of the HVAC equipment 100.

The HVAC equipment 100 further includes a burner assembly 103, an air/fuel control system 104, the blower motor and fan 105, an inducer motor and fan 106, a vent (not shown) for expelling noxious gases such as flue gas and carbon monoxide, a heat exchanger 107 and a HVAC equipment casing or housing 108. It will be appreciated that, in certain instances, the HVAC equipment 100 (shown as a furnace in FIG. 1), which is capable of setting airflow speeds as described herein, may not include a burner assembly 103 and/or an air/fuel control system 104.

In accordance with embodiments, the blower motor and fan 105 can be driven, for example, by a variable speed signal. This variable speed signal may enable the blower motor and fan 105 to be capable of moving air through the housing 108 at multiple and variable flow rates. This feature allows the HVAC equipment 100 to operate in multiple modes of operation and with multiple speeds for each mode as will be described below.

Figure 2:
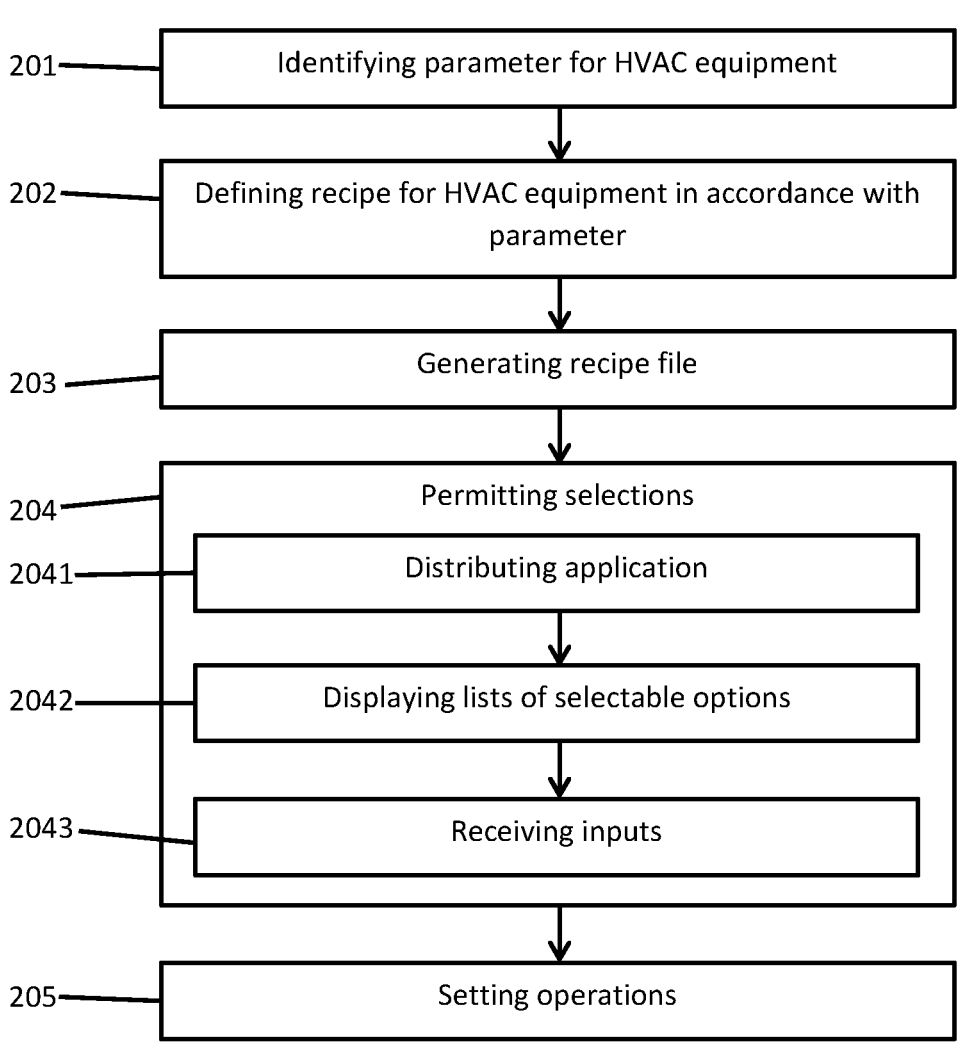
FIG. 2 is a flow diagram illustrating a method of establishing airflow settings for HVAC equipment in accordance with exemplary embodiments.

With reference to FIG. 2, a method 200 of establishing airflow settings for HVAC equipment is provided for the HVAC equipment 100 of FIG. 1 with the variable speed blower motor and fan 105 and for other HVAC equipment of varying types and size. The method 200 includes initially identifying a parameter for the HVAC equipment (i.e., the HVAC equipment 100 (or furnace) of FIG. 1) at block 201, defining a recipe for the HVAC equipment in accordance with the parameter at block 202, and generating a recipe file associated with the recipe and including lists of selectable options for each mode of operation of the HVAC equipment at block 203. The method 200 further includes permitting selections from each of the lists for each mode of operation of the HVAC equipment by an installer during an installation of the HVAC equipment in a system at block 204 and setting operations of the HVAC equipment according to each of the selections at block 205.

In accordance with embodiments, the parameter for the HVAC equipment that is initially identified at block 201 is a size of the HVAC equipment.

In accordance with further embodiments, the permitting of block 204 can include distributing an application (e.g., a mobile phone application) to the installer by way of, for example, the cloud or another similar network at block 2041, displaying the lists of the selectable options in a user interface (UI) of the application on either a display unit of the control device 101 or a fixed or mobile computing device of the installer on which the application is stored at block 2042 and receiving inputs of the selections via the UI at block 2043.

With reference to FIGS. 3 and 4, the recipe file generated at block 203 of FIG. 2 can be loaded into the memory of the control device 101 and accessed through the UI of the application.

As noted above, the HVAC equipment can be operable in multiple modes of operation including, but not limited to, a high heat mode, a low heat mode, a high cool mode, a low cool mode, and a continuous fan mode. As shown in FIG. 3, the lists of the selectable options, which are included in the recipe file that is generating at block 203 of FIG. 2, can include a list of supported airflows for each mode of operation of the HVAC equipment 301, a list of minimum airflows for each mode of operation of the HVAC equipment 302, and a list of maximum airflows for each mode of operation of the HVAC equipment 303. Alternatively, as shown in FIG. 4, the lists of the selectable options, which are included in the recipe file that is generating at block 203 of FIG. 2, can include default airflow indexes for each mode of operation of the HVAC equipment 401, minimum standard airflow indexes for each mode of operation of the HVAC equipment 402, maximum standard airflow indexes for each mode of operation of the HVAC equipment 403, minimum available airflow indexes for each mode of operation of the HVAC equipment 404, and maximum available airflow indexes for each mode of operation of the HVAC equipment 405.

During an installation of the HVAC equipment, the installer may be presented with an initial screen in the UI of the application requesting a selection of one of the modes of operation. Upon a selection one of the modes of operation (e.g., the high heat mode), the installer may then be presented with the list of the supported airflows 301 for the high heat mode and a request for a selection of one of the supported airflows.

With reference to FIG. 5, once the installer makes a selection of the supported airflows, additional operations 500 of the permitting of block 204 are permitted. The installer may test whether the selected supported airflow results in a targeted airflow through the HVAC equipment at block 501. The installer may then request airflows outside of the standard airflow range but inside of the available airflow range based on results of the testing (see FIG. 4) at block 502, and retest whether the airflows outside of the standard airflow range but inside of the available airflow range result in the targeted airflow through the HVAC equipment at block 503. The installer can then optionally update the selections in accordance with results of the retesting of block 503 at block 504. This process can be repeated for each mode of operation.

Technical effects and benefits of the present disclosure are the provision of a method of having each unit's airflow described in a separate recipe, whereby a common HVAC equipment control can be used for all HVAC equipment sizes with the recipe loaded for the controller to run the appropriate airflows for that specific HVAC equipment size. In addition, the installer can tailor HVAC equipment operations to match specific installation needs (duct work size, duct noise, filter use, etc.).

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A method of establishing airflow settings for heating, ventilation, and air conditioning (HVAC) equipment, the method comprising:

identifying a parameter for the HVAC equipment;

defining a recipe for the HVAC equipment in accordance with the parameter;

generating a recipe file associated with the recipe and comprising lists of selectable options for each mode of operation of the HVAC equipment;

permitting selections from each of the lists for each mode of operation of the HVAC equipment via a user interface (UI) during an installation of the HVAC equipment in a system; and setting operations of the HVAC equipment according to each of the selections, wherein the lists of the selectable options comprise:

default airflow indexes for each mode of operation of the HVAC equipment;

minimum standard airflow indexes for each mode of operation of the HVAC equipment;

maximum standard airflow indexes for each mode of operation of the HVAC equipment;

minimum available airflow indexes for each mode of operation of the HVAC equipment; and maximum available airflow indexes for each mode of operation of the HVAC equipment, and wherein the minimum and maximum available airflow indexes are outside of the minimum and maximum standard airflow indexes.

2. The method according to claim 1, wherein the HVAC equipment comprises a variable speed blower.

3. The method according to claim 1, wherein the parameter for the HVAC equipment is a size of the HVAC equipment.

4. The method according to claim 1, wherein the HVAC equipment is operable in a high heat mode, a low heat mode, a high cool mode, a low cool mode, and a continuous fan mode.

5. The method according to claim 1, wherein the permitting comprises:

distributing an application to a mobile device;

displaying the lists of the selectable options in the user interface (UI), which is associated with the application; and receiving inputs of the selections via the UI.

6. The method according to claim 5, wherein, once the installer makes a selection, the permitting further comprises:

testing whether the selection results in a targeted airflow through the HVAC equipment;

permitting the installer to request airflows outside of a standard airflow range according to the minimum and maximum standard airflow indexes but inside of an available airflow range according to the minimum and maximum available airflow indexes;

retesting whether the airflows outside of the standard airflow range but inside of the available airflow range result in the targeted airflow through the HVAC equipment; and optionally updating the selection in accordance with results of the retesting.

7. A method of establishing airflow settings for heating, ventilation, and air conditioning (HVAC) equipment, the method comprising:

identifying a size of the HVAC equipment;

defining a recipe for the HVAC equipment in accordance with the size;

generating a recipe file associated with the recipe and comprising, for each mode of operation of the HVAC equipment, a list of support airflows, a list of minimum standard airflows, a list of minimum available airflows, a list of maximum standard airflows and a list of maximum available airflows, wherein respective ranges of the minimum and maximum available airflows according to the lists of the minimum and maximum available airflows are outside of respective ranges of the minimum and maximum standard airflows according to the lists of the minimum and maximum standard airflows;

permitting, for each of the modes of operation of the HVAC equipment via a user interface (UI), selections from each of the lists by an installer during an installation of the HVAC equipment in a system; and setting operations of the HVAC equipment according to each of the selections.

8. The method according to claim 7, wherein the HVAC equipment comprises a variable speed blower.

9. The method according to claim 7, wherein the HVAC equipment is operable in a high heat mode, a low heat mode, a high cool mode, a low cool mode and a continuous fan mode.

10. The method according to claim 7, wherein the permitting comprises:

distributing an application to a mobile device;

displaying each list in the user interface (UI), which is associated with the application; and receiving inputs of the selections via the UI.

11. The method according to claim 7, wherein, once the installer makes a selection, the permitting further comprises:

testing whether the selection results in a targeted airflow through the HVAC equipment;

permitting the installer to request airflows outside of a standard airflow range but inside of an available airflow range;

retesting whether the airflows outside of the respective ranges of the minimum and maximum standard airflows but inside of the respective ranges of the minimum and maximum available airflows result in the targeted airflow through the HVAC equipment; and optionally updating the selection in accordance with results of the retesting.

12. A heating, ventilation, and air conditioning (HVAC) equipment, comprising:

a cabinet;

a blower configured to drive airflows through the cabinet; and a control board coupled to the blower and configured to control operations of the blower in accordance with HVAC equipment settings, the HVAC equipment settings being established in response to selections made by an installer during an installation of the HVAC equipment of selectable options of a recipe file, which is generated in accordance with a parameter for the HVAC equipment, for each mode of operation of the HVAC equipment, wherein the selectable options comprise:

default airflow indexes for each mode of operation of the HVAC equipment;

minimum standard airflow indexes for each mode of operation of the HVAC equipment;

maximum standard airflow indexes for each mode of operation of the HVAC equipment;

minimum available airflow indexes for each mode of operation of the HVAC equipment; and maximum available airflow indexes for each mode of operation of the HVAC equipment, and wherein the minimum and maximum available airflow indexes are outside of the minimum and maximum standard airflow indexes.

13. The HVAC equipment according to claim 12, wherein the blower is a variable speed blower.

14. The HVAC equipment according to claim 12, wherein the parameter for the HVAC equipment is a size of the HVAC equipment.

15. The HVAC equipment according to claim 12, wherein the HVAC equipment is operable in a high heat mode, a low heat mode, a high cool mode, a low cool mode and a continuous fan mode.

16. The HVAC equipment according to claim 12, wherein the control board is receptive of the selections made by the installer via the user interface (UI), which is a UI of a mobile application.

\* \* \* \* \*